(12) United States Patent
Atallah

(10) Patent No.: US 7,089,552 B2
(45) Date of Patent: Aug. 8, 2006

(54) SYSTEM AND METHOD FOR VERIFYING INSTALLED SOFTWARE

(75) Inventor: Dario Atallah, Louisville, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 567 days.

(21) Appl. No.: 10/230,686

(22) Filed: Aug. 29, 2002

(65) Prior Publication Data

US 2004/0044996 A1 Mar. 4, 2004

(51) Int. Cl.
*G06F 9/445* (2006.01)
(52) U.S. Cl. .................... 717/175; 717/176
(58) Field of Classification Search ........ 717/114–123, 717/168–178; 713/176–177, 180
See application file for complete search history.

(56) References Cited

U.S. PATENT DOCUMENTS 5,617,533 A 4/1997 Wu et al.
6,202,207 B1 3/2001 Donohue
6,381,742 B1 4/2002 Forbes et al.

OTHER PUBLICATIONS

Kim et al., "The Design and Implementation of Tripwire: A File System Integrity Checker", ACM, pp. 18-29, 1994.*
Weitlaner, "Metadata Visualization", Graz University of Technology, Austria, pp. i-ix, 1-96, Dec. 1999.*
Czerwinski et al., "An Architecture for a Secure Service Discovery Service", ACM, pp. 24-35, 1999.*
Bindel, "Extended Cryptographic File System", www.cs.berkeley.edu, pp. 1-11, 1999.*
Tolia et al, "Using Content Addressing to Transfer Virtual Machine State", Intel Research Pittsburgh, pp. 1-9, 2002.*

* cited by examiner

*Primary Examiner*—Ted T. Vo
(74) *Attorney, Agent, or Firm*—Michael C. Martensen; William J. Kubida; Hogan & Hatson LLP

(57) ABSTRACT

A method of identifying applications installed on a customer computer system by collecting signature information associated with installed binaries. The binaries are precisely identified by comparing the collected signature information to previously stored signatures. In a specific implementation the signatures comprise MD5 signatures.

15 Claims, 5 Drawing Sheets

BINARY FILE
- FILE NAME
- MD5 SIGNATURE
- SYMBOLS/ LIBRARIES LISTS
- ...

*FIG. 6A*

RELEASE
- RELEASE NAME
- UPDATE (DATE/ NAME)
- ARCHITECTURES SUPPORTED
- OS LIBRARY DEPENDENCE
- EXTERNAL DEPENDENCE
- ...

*FIG. 6B*

PRODUCT
- PRODUCT NAME
- FIRST SUMBISSION
- LAST SUMBISSION
- PARENT COMPANY
- ...

*FIG. 6C*

SYSTEM AND METHOD FOR VERIFYING INSTALLED SOFTWARE

BACKGROUND OF THE INVENTION

1. Field of the Invention

The present invention relates, in general, to software installation, and, more particularly, to software, systems and methods for verifying a number of installed binary programs.

2. Relevant Background

Software applications comprise a plurality of executable binary programs and data files that cooperate to perform program specified behaviors. While early software applications comprised an integral set of binary code, modern applications comprise a tens or hundreds of individual application components referred to as "binaries". The application is implemented by executing the plurality of binaries in a program-ordered sequence so as to implement the desired behavior. Each of the binaries can be associated with a signature such as an MD5 hash value that uniquely identifies the binary. An MD5 signature will change for different versions and different compilations of the binary, and so is a reliable identifier of the binary.

When application software is installed, the various binaries that make up the application are stored from a source file or installation file, which itself may comprise a plurality of files, into various locations within the file system of a computer upon which the application will execute. The file system may include network storage in addition to local storage. During execution, the various components interact with each other and with the operating system implemented on the computer to provide the desired application behavior. As the applications are often provided independently of the operating system, the developers of application software are often referred to as "independent software vendors" or "ISVs".

When a software application is installed, its constituent binaries are copied from an installation source file or files into various directories throughout the file system. The location of each binary in the file system is determined by the installation routines. In some cases applications are delivered as packages that are installed via an installation tool that maintains records of binary locations, making it easier to determine an accurate set of binaries on the particular computer. However, if even one application does not use standard package installation software precise installation records are not typically maintained. Further, binaries may be installed or modified manually after installation, making the installation records inaccurate or incomplete.

Hence, after installation, the operating system has no guaranteed knowledge of where each of the constituent binaries exist on a given system unless specific operating system services are used during the installation. Thereafter, when a given system is analyzed to determine if it will behave properly in response to an operating system change, the analysis typically relies on an imprecise determination of what applications are installed on the system. Accordingly, in current computer systems there is no readily accessible means to identify an accurate listing of installed applications and their constituent binaries.

Analyzing applications to ensure internal compatibility (i.e., compatibility between the binaries making up the application) is a relatively easy problem in that the ISV has control over all of the binaries. Testing applications to ensure external compatibility (i.e., compatibility with the operating systems) is more complex, but remains a finite problem in that the application can be tested against one or at most a few operating system specifications. However, in order to test a change in the operating system, the operating system provider must be able to test the changes against a large and often indeterminate number and variety of applications. Each of hundreds or thousands of binaries must be verified as compatible with the operating system changes. Moreover, this verification must be performed across not just one system, but against all applications that are supported by the operating system.

Operating system providers currently perform extensive testing of binaries to certify them as compatible with an operating system version or change. This testing is largely analytical in that the binary can be analyzed for compatibility with operating system interface specifications. A record of certified applications is maintained. However, it is impossible to certify every possible application. Moreover, because application software changes relatively rapidly, even a certified application may be updated after installation to include binaries that were not certified when the application was analyzed/tested. Hence, when an enterprise or user is considering updating the operating system, there is both real and perceived risk that an application will not function properly after the update. A need exists for a system and method for ensuring program compatibility with operating system changes.

SUMMARY OF THE INVENTION

Briefly stated, the present invention overcomes these and other limitations using a method of identifying applications installed on a customer computer system by collecting signature information associated with installed binaries. The binaries are precisely identified by comparing the collected signature information to previously stored signatures. In a specific implementation the signatures comprise MD5 signatures.

BRIEF DESCRIPTION OF THE DRAWINGS

FIG. 6A, FIG. 6B, and FIG. 6C show exemplary data structures used in a certification database of a particular implementation of the present invention.

DETAILED DESCRIPTION OF THE PREFERRED EMBODIMENTS

The present invention is specifically described herein as a component of a software application certification system in which features of the present invention are used to precisely identify software applications installed at a customer location. Once the set of software applications is precisely known, a number of uses for this information are possible. In the certification system, for example, the precise information can be used to predict with a high degree of accuracy the results of a particular operating system (OS) or application installation or upgrade, by identifying binaries that have been previously analyzed for compliance with the operating system, or compared with a known set of binaries.

The present invention may be implemented in single computer systems, but is more typically implemented across an entire network or enterprise. In this manner, an enterprise can determine a comprehensive list of software applications and their constituent binary files across a large number of computers. The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary the present invention is applicable to significantly larger, more complex network environments as well as small network environments such as conventional LAN systems.

Figure 1:
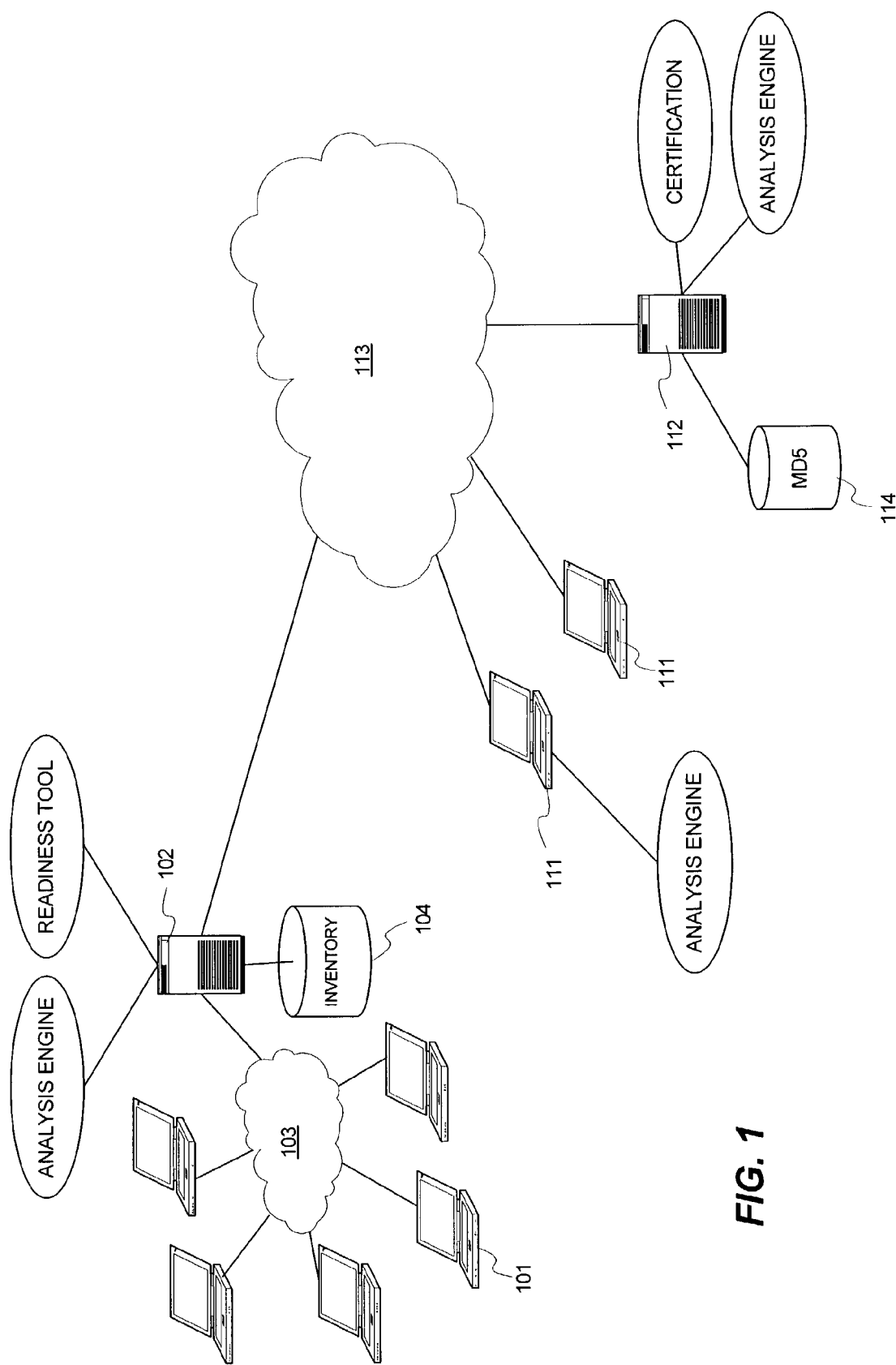
FIG. 1 shows a networked computer environment in which the present invention is implemented.

FIG. 1 shows an exemplary computing environment in which the present invention may be implemented. A customer site may comprise one or more customer computers 101 in communication with one or more servers 102 through a network 103. In a particular implementation, the present invention is used to create an inventory 104 of software applications and binaries that are installed on the one or more servers 102. However, the invention is readily extended to collect signature information about network connected customer computers 101 as well.

Network 103 may be implemented using any available technology and topology to meet the needs of a particular application. While FIG. 1 suggests a client-server network, peer-to-peer type networks can also benefit from the present invention. In one alternative, customer computers 111 couple directly to a public network 113 to obtain software application identification services in accordance with the present invention.

In the implementation shown in FIG. 1, a centralized certification service is implemented by server 112 that is accessed through public network 113. This configuration enables certification services to be readily accessed and shared amongst a large number of users. It is contemplated, however, that the present invention could be readily implemented without using a public network at all. In such cases, the signature databases 114 could be implemented on server 102, any of customer machines 101 or 111, or by way of a mass storage device such as a CDROM or magnetic tape coupled to customer machines 101/111.

An important feature of the present invention is the development of a signature data structure 114, inventory data structure 104, and the comparison of these two data structures to precisely identify installed software applications. The signature data structure 114 comprises records that associate software applications and their constituent binary files with a unique signature. In particular examples, an MD5 signature, which is routinely determined for binary files, is used. An MD5 is typically provided by an independent software vendor with each binary file release and patch. Other unique signatures that uniquely identify a binary file may be used, although a hash function like the MD5 is valuable in that the signature value will change if the file size changes, versions change, compilation date changes, or any number of other changes occur to the binary file.

Algorithms for computing unique signatures from binary files are widely available. Ideally, signature data structure 114 includes every potential software application that might be installed on a server 102 and/or customer systems 101/111, and updates, including patches and new functionality. In practice, however, the set of software applications represented in signature data structure 114 can be as inclusive or exclusive as desired for a particular implementation. In a particular example, signatures are gathered from signature data structure 114 using certification processes implemented on one or more servers 112. The certification processes may include a suite of processes that verify new software applications and updates are compatible with OS specifications (e.g., the OS application binary interface) specification. During this process, the signature information is either extracted or computed, and stored along with any other desired metadata in signature data structure 114.

While signature data structure 114 includes information about many possible software applications, inventory data structure 104 comprises information about specific instances of installed software at a customer site on one or more servers 102 and/or customer systems 101/111. Inventory data structure 104 may be implemented from a data record, set of records, table, file, database, or other data structure depending on the needs of the particular implementation. Inventory data structure 104 comprises primarily signature information (e.g., MD5 signatures in a particular implementation) and so may be compact in some instances.

While it is preferred that the inventory data structure 104 contain an inclusive set of signatures representing all binaries installed on servers 102 and/or customer computers 101/111, it is contemplated that a less than inclusive listing may be useful in some circumstances. For example, inventory data structure 104 may represent only a subset of independent software vendors. Also, while the present invention is particularly interested in creating an inventory of binary files, a signature can be associated with any type of file including text, images, dynamic link libraries, database files, and the like. Inventory data structure 104 is adapted to store the particular kinds of signature data collected in any particular implementation.

In a particular example, a "readiness tool" is used to collect signatures into inventory data structure 104. The readiness tool is conveniently implemented as a software process executing on server 102 or executing remotely on server 112. Further, the readiness tool may execute on a customer system 101 or 111 directly. The readiness tool examines the file system, including network file systems if implemented, of selected customer systems 101/111, as well as the file system of any servers coupled to network 103. The readiness tool extracts and collects signature information from the binary files of the examined file system. Alternatively, the readiness tool may compute the signature information using, for example, a hash algorithm.

Figure 3:
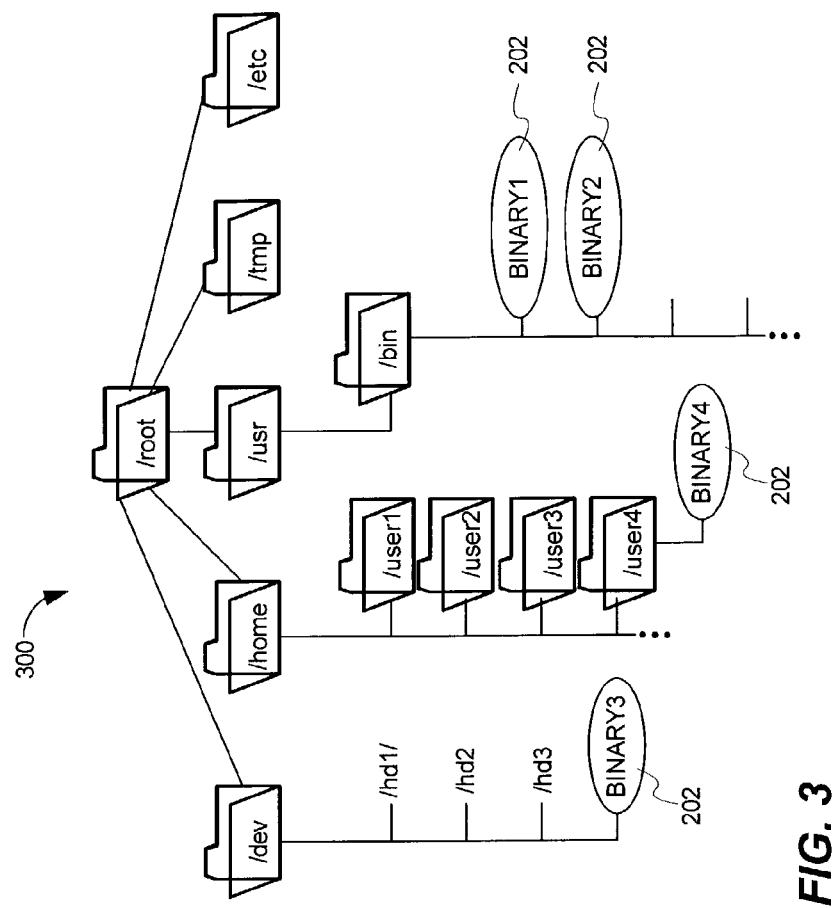
FIG. 3 illustrates an exemplary file system used in conjunction with an implementation of the present invention.
Figure 2:
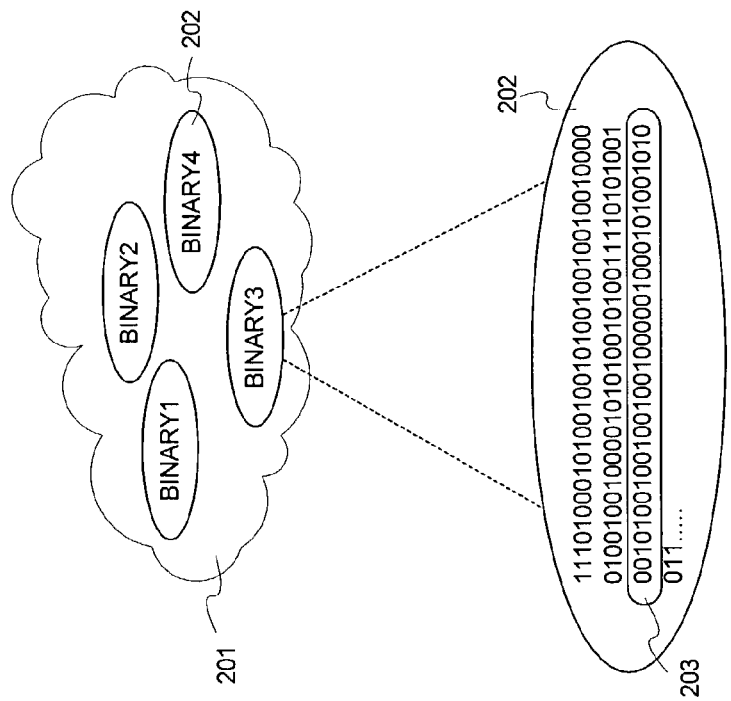
FIG. 2 shows an exemplary software application packaging scheme used in conjunction with the present invention.

FIG. 2 illustrates a simplified representation of a "package" 201 used to install a software application on a computer such as server 102 or customer computers 101/111 shown in FIG. 1. A package 201 is used broadly herein to include any collection of files, such as binaries 202, that are used as an installation source. As shown in FIG. 2, a binary 202 comprises binary encoded information including a signature 203. In some cases, signature 203 is not included within binary 202, and is instead computed by way of an algorithmic analysis applied to the binary encoded information, or otherwise associated with binary 202. In FIG. 3, an exemplary file system 300 having a "root" directory and various subdirectories is shown.

Figure 4:
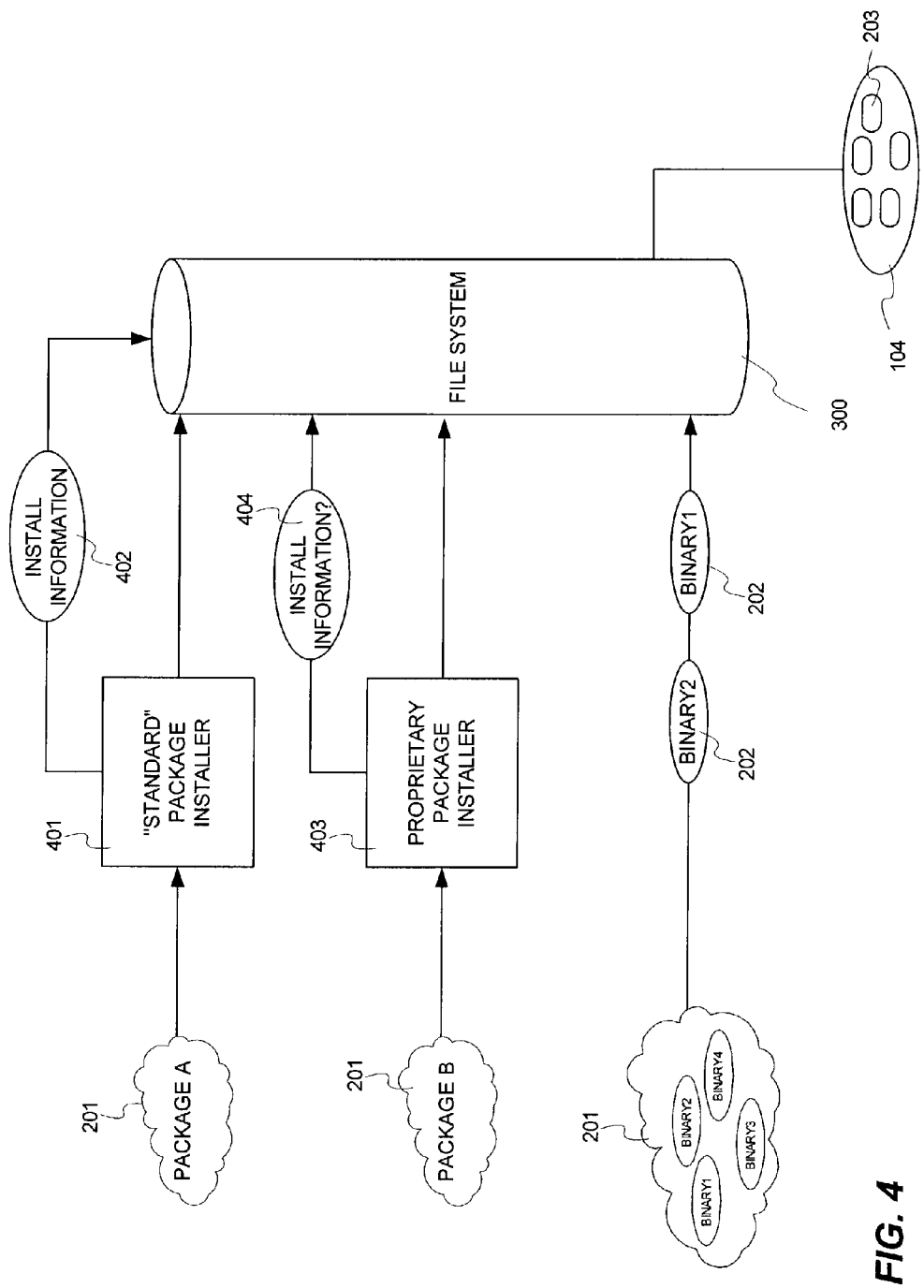
FIG. 4 illustrates, in block diagram form, a package installation process used in conjunction with the present invention.

As noted hereinbefore, one problem with the various installation mechanisms that are used is that binaries 202 may be located anywhere within the file system, making it difficult to precisely determine what binaries are installed in a particular instance. However, in practice binaries 202 may be installed in various directories such as a /dev directory used for device drivers, and user directories. FIG. 4 illustrates a number of package installation techniques. These files may be installed using an operating system specific installation process 401 such as "pkgadd" in the Solaris® computing environment, or by proprietary installation routines 403 provided by the ISV or a third party, or manually installed. One feature of the present invention is that the precise inventory is largely independent of the manner in which a package 201 is installed.

When a single, known package installation process is used that package installer could apply a known set of rules (e.g., all binary files are placed in the "/root/usr/bin" sub-directory) could be used. Moreover, a package installer 401/403 may maintain a log of install information 402 or 404 that can be used to precisely identify installed software. However, the installation logs 402/404 are imprecise unless the package installer 401/403 is used for all software installation. In accordance with the present invention, the readiness tool processes are used to examine file system 300 to collect signatures 203 in a data structure 104. Signatures 203 can be collected at any time, and the collection process is independent of the installation processes used to add a package to a particular computer system. Signatures may be compiled not only through a certiciation process, but by any available means. For example, an ISV may send a list of MD5 signatures associated with binaries in a particular application or package.

Figure 5:
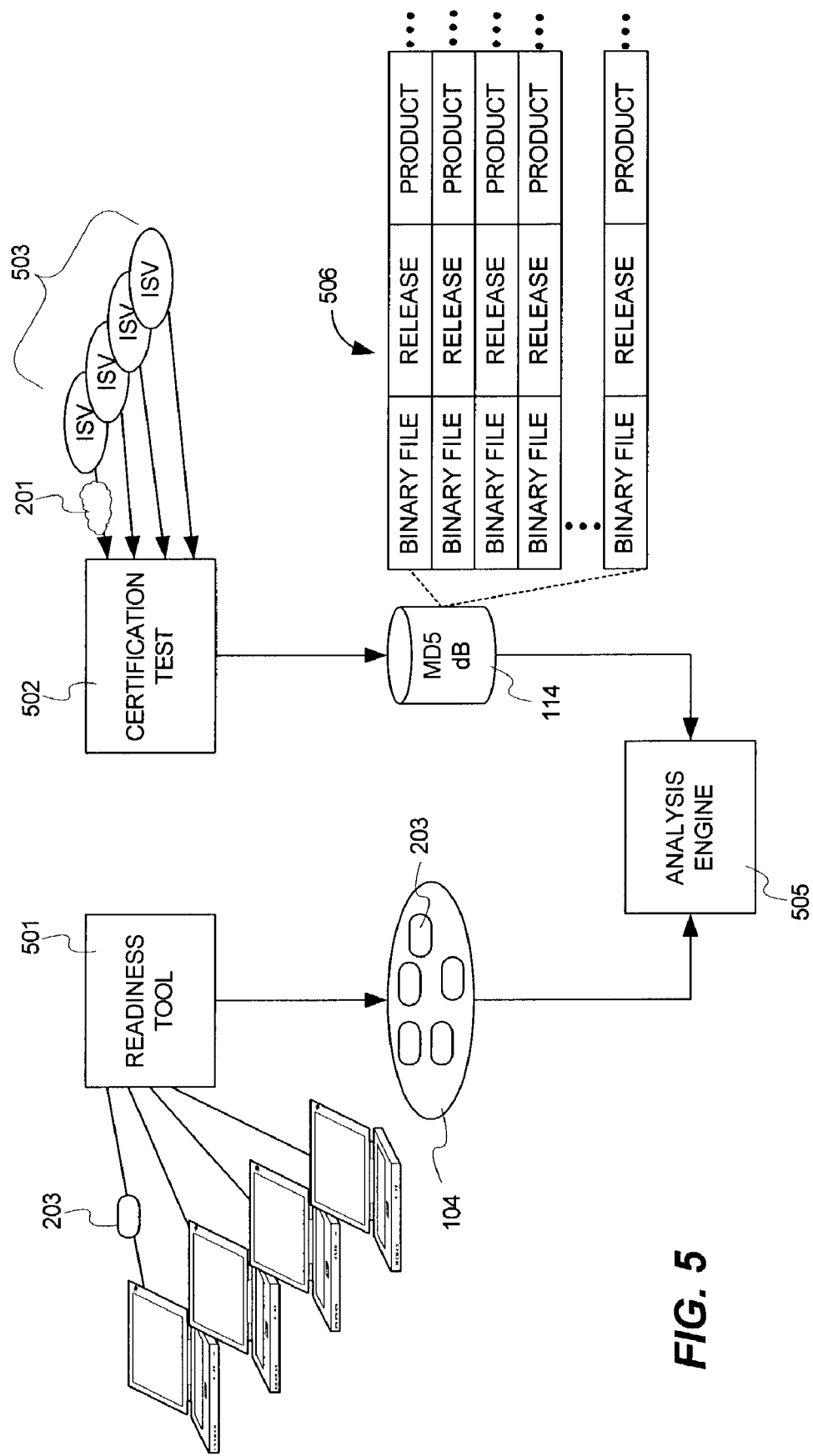
FIG. 5 illustrates, in block diagram form, data communication and processing in accordance with an embodiment of the present invention.

In the example of FIG. 5, readiness tool 501 is implemented on either a server 102, customer computer system 101/111, or a remote server 112. The readiness tool 501 collects a set of signatures 203 representing installed software in a particular system. This collection may comprise hundreds or even thousands of signatures for a particular computer system depending on the number of installed binaries. Separately, certification test services 502 receive packages 201 from ISVs 503 for analysis. Creating a signature data structure 114 is only a small part of the certification test services 502 in most cases, however, the details of other certification processes are not needed for a complete understanding of the present invention.

The signature data structure 114 comprises a plurality of records 506, where each record relates to a particular binary file. Each record includes, for example, information about the binary file, information about the release of the binary file, and producer information. Other data may be included as desired in each record 506. In operation, an analysis engine 505 executing on either a server 102, remote server 112, or a customer computer 101/111 will implement an analysis engine that compares one or more collected signatures 203 to the signature data structure 114. When a collected signature 203 exactly matches a signature in signature data structure 114, the binary file is known to be an exact copy of the file represented in the signature data structure 114. In this manner it can be assured that the identity, source, compilation time, version number, and any other desired information about the binary are known with certainty.

FIG. 6A, FIG. 6B and FIG. 6c illustrate examples of types of information that may be maintained in the record 506. For example, the binary file information may include file name, md5 signature, lists of symbols and libraries used by the binary and the like. The release information may include, for example, the release name, update date, supported processor and operating system platforms, as well as external dependencies and the like. In a particular implementation, the release information stored in the signature database is used to analyze an application to certify compliance with an OS's ABI. The product information show in FIG. 6C may include, for example, a product name, information about when the product was submitted for certification and/or obtained certification, information about companies related to the producer, and the like.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method of identifying applications installed on a customer computer system comprising:
   collecting signature information associated with at least one binary installed on the customer computer system forming a signature data structure for the customer computer system wherein signature information comprises data about the at least one binary installed on the customer computer system as the at least one binary was released for installation;
   precisely identifying what binaries exist on the customer computer system;
   collecting information about at least one installed binary on the customer computer system forming an inventory data structure for the customer computer system wherein the inventory data structure comprises signature information about the at least one installed binary; and
   comparing the inventory data structure with corresponding portions of the signature data structure to determine whether the at least one installed binary on the customer computer system is an exact copy of the at least one binary as it was released for installation.

2. The method of claim 1 wherein the signatures comprise MD5 signatures.

3. The method of claim 1 wherein information describing the associated binary indicates compatibility of the binary with a particular operating system application binary interface.

4. The method of claim 1 wherein the step of collecting signature information comprises:
   extracting signature information that is precomputed and stored with the binary.

5. The method of claim 1 wherein the step of collecting signature information comprises computing signature information for the binary installed on the customer system.

6. The method of claim 1 further comprising:
   after precisely identifying the binaries that exist on the customer computer system, performing at least one post-identification process based on the precise identification.

7. The method of claim 1 wherein the act of collecting signature information associated with binaries installed on the customer computer system is performed in a manner that is substantially independent of the manner in which the binaries were installed on the customer computer system.

8. A system for identifying applications installed on a customer computer system comprising:
   a signature data structure comprising a plurality of records, each record including an association between a binary file and a unique signature for that binary file, wherein each record of the signature data structure comprises information selected from the group consisting of application name, application version number, application release date, and installation directory as the binary file was released for installation;

a collection process executing on the customer computer system and operable to determine signatures associated with binaries existing on the customer computer system forming an inventory data structure; and a content identification mechanism operable to compare the collected signatures of the inventory data structure against the signature data structure to identify the binaries installed on the customer computer system that are exact copies of the binaries as they were released for installation.

9. The system of claim 8 wherein the signature comprises a hash value computed from the associated binary.

10. The system of claim 8 wherein the signature comprises an MD5 hash value.

11. The system of claim 8 wherein each record of the signature data structure comprises installation information relating to a manner in which the associated binary file is installed in the customer system.

12. A computer program product configured to cause a computer to identify applications installed on a customer computer system comprising;

first program code devices operable on the customer computer system configured to collect signature information associated with binaries installed on the customer computer system forming an inventory data structure;

second computer program code devices operable on a computer separate from the customer computer system configured to maintain previously stored signatures in a data structure that associates the previously stored signatures with information describing the associated binary as the associated binary was released for installation; and third computer program code devices configured to compare the inventory data structure to the previously stored signature information.

13. The computer program product of claim 12 wherein the signatures comprise MD5 signatures.

14. The computer program product of claim 12 wherein the first and second program code devices operate in a manner that is substantially independent of the manner in which the binaries were installed on the customer computer system.

15. The computer program product of claim 12 wherein the first program code devices comprise methods that extract an MD5 value from the associated installed binary.

* * * * *